(12) United States Patent
Negi (10) Patent No.: US 9,497,404 B2
(45) Date of Patent: Nov. 15, 2016

(54) INFORMATION PROCESSING APPARATUS, METHOD, AND PROGRAM

(75) Inventor: Daisuke Negi, Tokyo (JP)

(73) Assignee: Sony Corporation, Tokyo (JP)

( * ) Notice: Subject to any disclaimer, the term of this patent is extended or adjusted under 35 U.S.C. 154(b) by 1979 days.

(21) Appl. No.: 11/565,155

(22) Filed: Nov. 30, 2006

(65) Prior Publication Data

US 2007/0143794 A1 Jun. 21, 2007

(30) Foreign Application Priority Data

Dec. 15, 2005 (JP) .................................. 2005-361345

(51) Int. Cl.
*H04N 5/445* (2011.01)
*H04N 7/16* (2011.01)
(Continued)

(52) U.S. Cl.
CPC .......... *H04N 5/44543* (2013.01); *H04N 7/163* (2013.01); *H04N 21/4331* (2013.01);
(Continued)

(58) Field of Classification Search
CPC ..................... H04N 21/4325; H04N 21/4331; H04N 21/434; H04N 21/4341; H04N 21/4343; H04N 21/4348; H04N 21/4349; H04N 21/4351; H04N 21/4352; H04N 21/44; H04N 21/44008; H04N 21/44012; H04N 21/44016; H04N 21/458; H04N 21/4586; H04N 21/4622; H04N 21/466; H04N 21/4667; H04N 21/4668; H04N 21/47217; H04N 21/4722; H04N 21/482; H04N 21/83; H04N 21/8456; H04N 5/44543; H04N 5/50; H04N 21/2625; H04N 21/26258
USPC ................. 725/61, 13, 14, 28; 386/241, 243
See application file for complete search history.

(56) References Cited

U.S. PATENT DOCUMENTS 4,573,072 A * 2/1986 Freeman ....................... 725/136
4,757,393 A * 7/1988 Dakin et al. .................. 386/241
(Continued)

FOREIGN PATENT DOCUMENTS

JP    2000-115646    4/2000
JP    2001-086420    3/2001
(Continued)

OTHER PUBLICATIONS

Office Action issued Jul. 12, 2011 in Japan Application No. 2005-361345.

*Primary Examiner* — Pankaj Kumar
*Assistant Examiner* — Reuben M Brown
(74) *Attorney, Agent, or Firm* — Oblon, McClelland, Maier & Neustadt, L.L.P.

(57) ABSTRACT

The invention relates to an auto zapping function corresponding to user' taste. A block receives a particular channel and disassembles the received channel into intervals (chapters) of predetermined length. The block calculates scores of chapters, based on a result of comparison of EPG information of a program from an EPG acquiring part, symbol information from a symbol information managing part, viewing history from a viewing history managing part, and news information from WWW news site and the like in an RSS acquiring part, etc. with meta information obtained from the chapters, viewer responsiveness obtained from the chapters, etc., and provides a result of calculation and starting time and ending time of the chapters to a chapter selecting part. The chapter selecting part selects chapters to be most highly recommended to a user, based on scores, which are provided from the block, for chapters of a program being broadcasted in each channel. The selected chapters are sequentially reproduced. The present invention is applied to a television receiver.

12 Claims, 8 Drawing Sheets

(51) Int. Cl.
   *H04N 21/433*   (2011.01)
   *H04N 21/45*    (2011.01)
   *H04N 21/462*   (2011.01)
   *H04N 21/466*   (2011.01)
   *H04N 21/482*   (2011.01)
   *H04N 21/83*    (2011.01)
   *H04N 21/845*   (2011.01)
   *G06F 13/00*    (2006.01)
   *G06F 3/00*     (2006.01)
   *H04N 5/50*     (2006.01)

(52) U.S. Cl.
   CPC ........ *H04N21/4532* (2013.01); *H04N 21/466* (2013.01); *H04N 21/4622* (2013.01); *H04N 21/4667* (2013.01); *H04N 21/4668* (2013.01); *H04N 21/482* (2013.01); *H04N 21/83* (2013.01); *H04N 21/8456* (2013.01); *H04N 5/50* (2013.01)

(56) References Cited

U.S. PATENT DOCUMENTS

| | | | | |
|---|---|---|---|---|
| 5,710,815 | A * | 1/1998 | Ming et al. | 380/241 |
| 6,675,384 | B1 * | 1/2004 | Block et al. | 725/28 |
| 6,947,966 | B1 * | 9/2005 | Oko et al. | 709/203 |
| 7,180,917 | B1 * | 2/2007 | Marko et al. | 370/535 |
| 7,380,258 | B2 * | 5/2008 | Durden et al. | 725/25 |
| 8,813,122 | B1 * | 8/2014 | Montie | H04N 5/44543 386/292 |
| 2003/0035072 | A1 * | 2/2003 | Hagg | 348/729 |
| 2003/0126600 | A1 * | 7/2003 | Heuvelman | H04N 5/44543 725/35 |
| 2004/0268398 | A1 * | 12/2004 | Fano | G11B 27/105 725/88 |
| 2005/0028194 | A1 * | 2/2005 | Elenbaas et al. | 725/32 |
| 2005/0060741 | A1 * | 3/2005 | Tsutsui et al. | 725/32 |
| 2006/0101491 | A1 * | 5/2006 | Tsuruta et al. | 725/58 |
| 2006/0136973 | A1 * | 6/2006 | Baekeland | H04N 7/173 725/105 |
| 2007/0143794 | A1 * | 6/2007 | Negi | H04N 5/44543 725/45 |
| 2008/0002776 | A1 * | 1/2008 | Borer | H04N 21/23424 375/240.26 |
| 2014/0040744 | A1 * | 2/2014 | DeWitt | 715/723 |

FOREIGN PATENT DOCUMENTS

| | | |
|---|---|---|
| JP | 2002-7458 | 1/2002 |
| JP | 2002-335459 | 11/2002 |
| JP | 2005-045572 | 2/2005 |
| JP | 2005-210686 | 8/2005 |
| WO | WO 2004/030352 A1 | 4/2004 |

\* cited by examiner

INFORMATION PROCESSING APPARATUS, METHOD, AND PROGRAM

CROSS REFERENCES TO RELATED APPLICATIONS

The present invention contains subject matters related to Japanese Patent Application JP 2005-361345 filed in the Japanese Patent Office on Dec. 15, 2005, the entire contents of which being incorporated herein by reference.

BACKGROUND OF THE INVENTION

1. Field of the Invention

The present invention relates to an information processing apparatus and method, and a program, and more particularly, to an information processing apparatus and method, which is capable of selecting a portion to user's taste from a program on the air and displaying the selected portion on a display, and a program.

2. Description of Related Art

For example, as one of functions of a receiver that receives a television broadcasting program, there exists a channel zapping function of changing a channel without specifying a broadcasting channel.

In related art, according to this zapping function, since a user can change the channel suitably by pushing a channel change key, he/she can simply select a desired program. For example, a zapping function over a plurality of broadcast waves is disclosed in JP-A-2001-86420 (Patent Document 1).

However, in such a related-art zapping function, since the channel is changed in prescribed order when a user pushes the channel change key, a program broadcasted in the channel is viewed irrespective of user's taste, for example. In other words, since the user views programs not desired by him/her, it is difficult for him/her to find out a desired program with efficiency.

SUMMARY OF THE INVENTION

It is desirable to automatically change and display a scene of a program to user's taste, for example.

According to an embodiment of the present invention, there is provided an information processing apparatus that selects particular contents from a plurality of contents outputted according to a prescribed schedule and outputs the selected contents, including: an input unit that inputs the plurality of contents; a disassembling unit that disassembles each of the plurality of contents inputted by the input unit into chapters; and a selecting unit that selects a chapter to be outputted according to the schedule, from the chapters produced in the disassembling unit.

The disassembling unit includes: a buffer that stores the chapters, and a comparing unit that compares selection information with information on the chapters.

The selecting unit selects the chapter to be outputted according to the schedule, based on a result of the comparison of the comparing unit.

Preferably, the selection information includes EPG information, RSS information, symbol information, or viewing history information, and the information on the chapters includes viewer responsiveness or meta information.

Preferably, the comparing unit calculates scores of the chapters, based on the selection information and the information on the chapters, and the selecting unit selects a chapter to be outputted next, based on the calculated scores.

Preferably, new chapters are stored in the buffer while old chapters are sequentially removed from the buffer, depending on a storage capacity of the buffer.

Preferably, the disassembling unit disassembles a scene into which the contents are arranged with significance based on video or audio features of the contents, as a chapter.

According to another embodiments of the present invention, there are provided an information processing method of selecting particular contents from a plurality of contents outputted according to a prescribed schedule and outputting the selected contents and a program that causes a computer to perform an information process of selecting particular contents from a plurality of contents outputted according to a prescribed schedule and outputting the selected contents. The method and the program include the step of selecting a chapter to be outputted according to the schedule, from chapters that constitute each of the plurality of contents inputted. The step of selecting the chapter includes selecting the chapter to be outputted according to the schedule, based on a result of comparison of selection information with information on the chapter.

According to the embodiment of the present invention, a program of a received channel can be automatically changed and displayed according to user's taste, for example.

DETAILED DESCRIPTION OF PREFERRED EMBODIMENTS

In the following description, constituent requirements of the invention have a correspondence relation with embodiments disclosed in the detailed description of the invention as follows. The disclosed embodiments are provided to support and ascertain the spirit of the invention. Accordingly, it should be understood that other embodiments, although not explicitly disclosed in the detailed description of the invention, may also be in correspondence to the constituent requirements of the invention. Conversely, it should be understood that embodiments disclosed in correspondence to particular constituent requirements of the invention may be in correspondence to other constituent requirements of the invention.

According to an embodiment of the present invention, there is provided an information processing apparatus (for example, a television receiver 1 of FIG. 1) that selects particular contents from a plurality of contents outputted according to a prescribed schedule and outputs the selected contents, including:

an input unit (for example, a receiving part 31) that inputs the plurality of contents;

a disassembling unit (for example, a chapter extracting part 33 of FIG. 2) that disassembles each of the plurality of contents inputted by the input unit into chapters; and a selecting unit (for example, a chapter selecting part 17 of FIG. 1) that selects a chapter to be outputted according to the schedule, from the chapters produced in the disassembling unit.

The disassembling unit includes:

a buffer (for example, a buffer 32 of FIG. 2) that stores the chapters, and a comparing unit (for example, a score calculating part 36 of FIG. 2) that compares selection information with information on the chapters.

The selecting unit selects the chapter to be outputted according to the schedule, based on a result of the comparison of the comparing unit.

Figure 1:
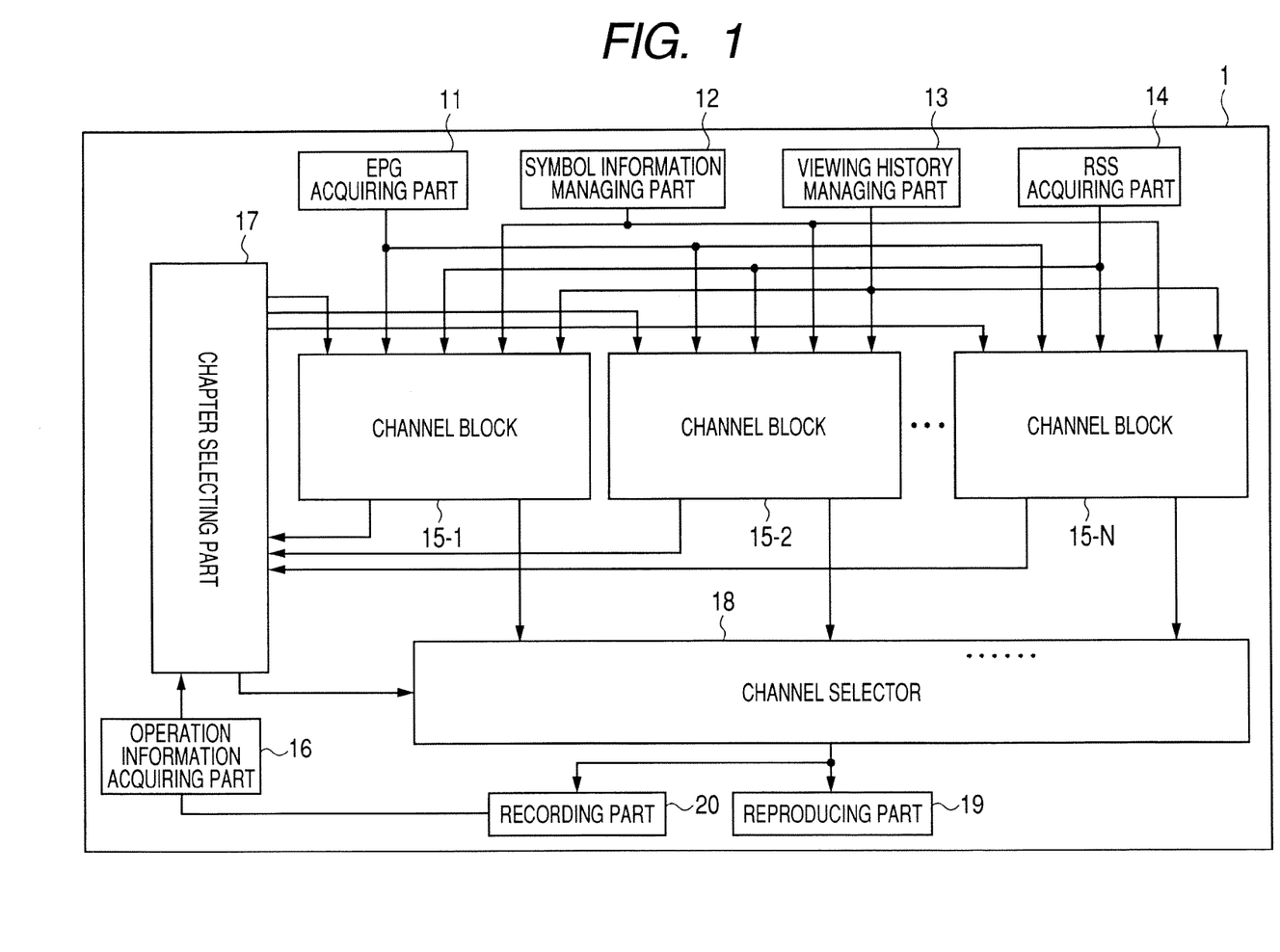
FIG. 1 is a block diagram showing an example of configuration of a television receiver to which the present invention is applied.
Figure 2:
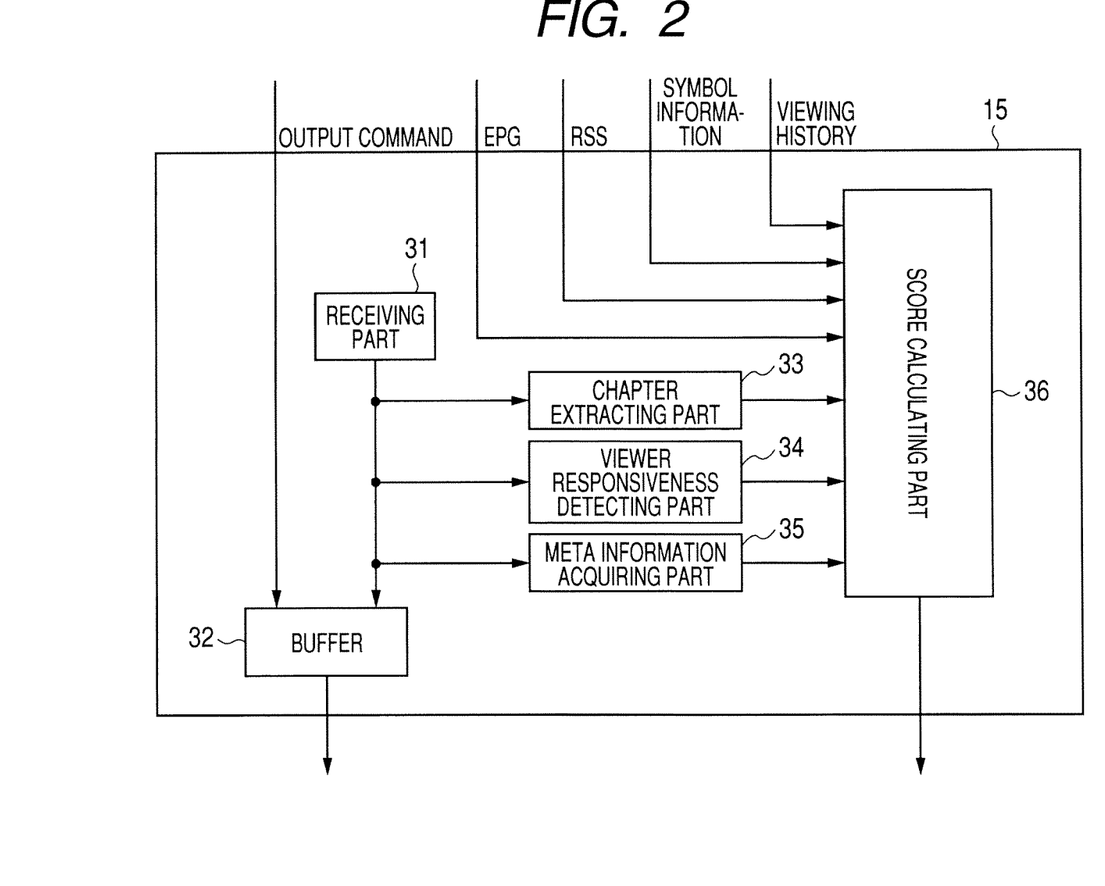
FIG. 2 is a block diagram showing an example of configuration of a channel block of FIG. 1.

The selection information includes EPG information (for example, output of an EPG acquiring part 11 of FIG. 1), RSS information (for example, output of an RSS acquiring part 14 of FIG. 1), symbol information (for example, output of a symbol information managing part 12 of FIG. 1), or viewing history information (for example, output of a viewing history managing part 13 of FIG. 1), and the information on the chapters includes viewer responsiveness (for example, output of a viewer responsiveness detecting part 34 of FIG. 2) or meta information (for example, output of a meta information acquiring part 35 of FIG. 2).

The comparing unit calculates scores of the chapters, based on the selection information and the information on the chapters, and the selecting unit selects a chapter to be outputted next, based on the calculated scores.

According to another embodiment of the present invention, there is provided an information processing method of selecting particular contents from a plurality of contents outputted according to a prescribed schedule and outputting the selected contents, including the step of:

selecting a chapter to be outputted according to the schedule, from chapters that constitute each of the plurality of contents inputted (for example, a flow chart of FIG. 3), and a program that causes a computer to perform the information processing method.

Figure 3:
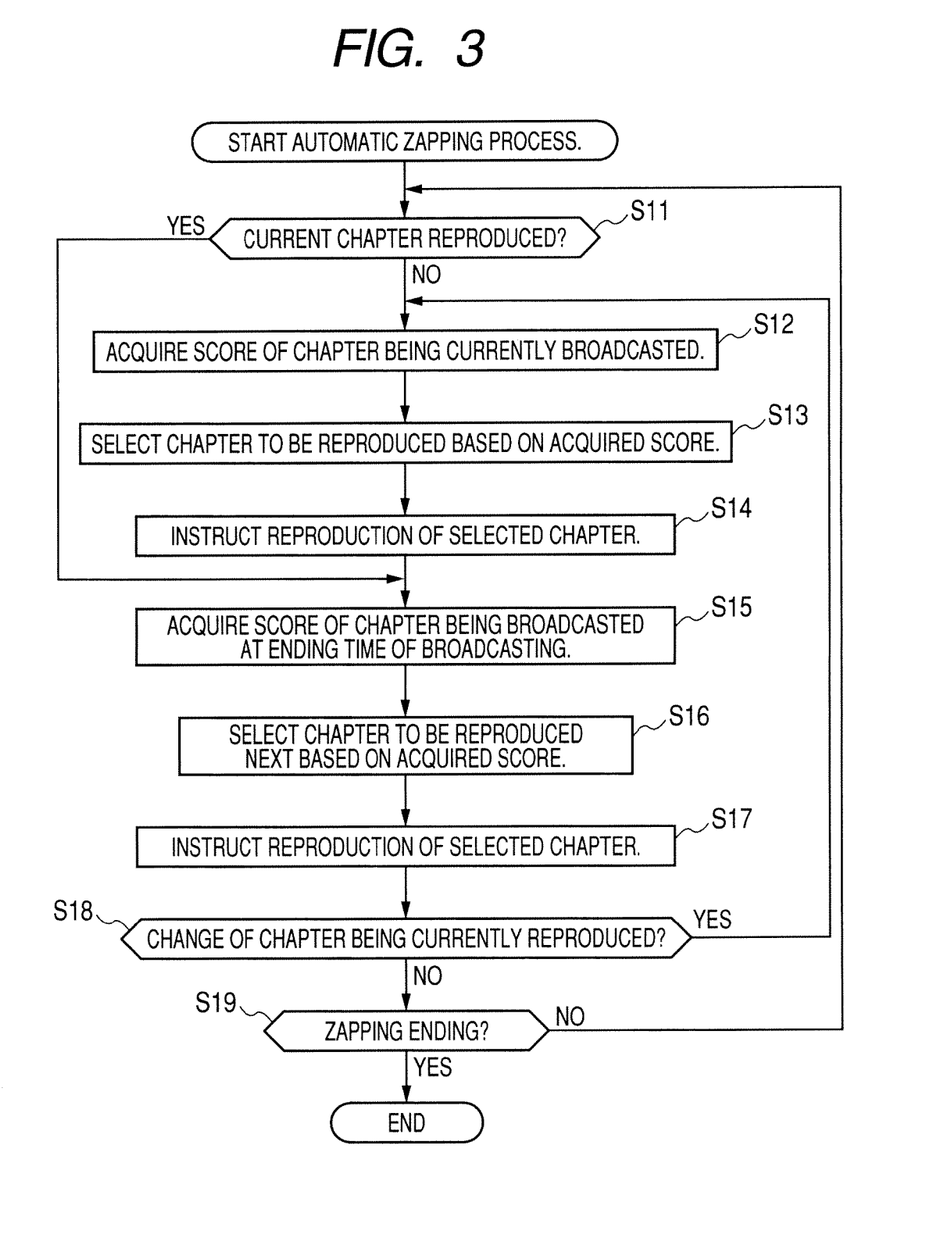
FIG. 3 is a flow chart explaining an automatic zapping process.

The step of selecting the chapter includes selecting the chapter to be outputted according to the schedule, based on a result of comparison of selection information with information on the chapter (for example, Step S16 of FIG. 3).

FIG. 1 shows an example of configuration of a television receiver 1 to which the present invention is applied.

The television receiver 1 has a function of changing contents (for example, a program) of a receiving channel by the unit of interval of predetermined length (hereinafter, referred to as a chapter) according to user' taste, for example, and automatically displaying the changed contents (hereinafter, referred to as an automatic zapping function). This function allows a user to view a scene to his taste by snatches among programs on the air, without operating a remote controller or the like.

An EPG acquiring part 11 acquires an EPG (Electronic Program Guide) for each channel on the air, disassembles the acquired EPG for each channel, and provides EPG information according to the channel to channel blocks 15-1 to 15-N (hereinafter, simply referred to as a channel block 15 if not needed to distinguish among them) that receives the channel.

In addition, if the EPG acquiring part 11 can acquire information on a program, it can also acquire meta information of the program from a Web site that introduces the program, for example.

A symbol information managing part 12 manages keywords, such as names of concerned entertainers, registered by a user, as symbol information of the user, for example, and provides the keywords to the channel block 15, if necessary.

In addition, the symbol information managing part 12 may be a cooperation filtering system or other systems as long as it can acquire the symbol information. In this case, the symbol information managing part 12 may acquire symbol information of different users having the same taste as the user.

A viewing history managing part 13 manages history of a program recorded or viewed in the past by a user, and provides the history of the program to the channel block 15, if necessary.

In addition, if the viewing history managing part 13 can acquire the viewing history, it can acquire the viewing history from a Web site forming a viewing history statistical database of the user, for example. In this case, the viewing history managing part 13 may acquire information on highly popular contents.

An RSS acquiring part 14 acquires up-to-date news information from titles, addresses, captions, summaries, update time, etc. described in RSS (Rich Site Summary) of each page of a Web site, and provides the up-to-date new information to the channel block 15.

In addition, if the RSS acquiring part 14 can acquire up-to-date information, it can also acquire information from a HTTP client, for example. In this case, the RSS acquiring part 14 can acquire more up-to-date information. In addition, an information source of the RSS acquiring part 14 may not be a Web sit that provides news information, but may be a Web site that provides information such as ranking of popular dramas. In this case, the RDD acquiring part 14 can acquire up-to-date information on the popular dramas.

The channel block 15-1 receives a program of a particular channel, temporarily stores the received program, and disassembles the program into intervals of predetermined length (chapters).

The channel block 15-1 calculates scores as a degree of recommendation to users of the chapter, based on a result of comparison of the EPG information of the program from the EPG acquiring part 11, the symbol information from the symbol information managing part 12, the viewing history from the viewing history managing part 13, the news information from the RSS acquiring part 14, etc. with the meta information obtained from the chapter, viewer responsiveness obtained from the chapter, etc., and provides a result of calculation and information specifying the chapter, such as starting time and ending time of the chapter (hereinafter, referred to as time information, if not needed to distinguish between them) and the like, to a chapter selecting part 17.

In addition, the channel block 15-1 provides temporarily stored chapters to a channel selector 18 according to an instruction from the chapter selecting part 17.

The channel blocks 15-2 to 15-N have the same configuration and operation as the channel block 15-1 except for received channels.

An operation information acquiring part 16 acquires operation contents inputted by a user through an operation part (not shown), and provides the operation contents to the chapter selecting part 17 or a recording part 20, if necessary.

For example, if the user operates the operation part to use the automatic zapping function, the operation information acquiring part 16 informs the chapter selecting part 17 of the fact. Then, the chapter selecting part 17 starts the automatic zapping process, which will be described later.

In addition, when the user operates the operation part to change a chapter (scene), which is viewed by the automatic zapping function and selected by the chapter selecting part 17, at his/her own will, the operation information acquiring part 16 informs the chapter selecting part 17 of the fact. Then, the viewed chapter is changed.

In addition, when the user operates the operation part to record a broadcasting program being viewed, the operation information acquiring part 16 informs the recording part 20 of the fact. Then, the recording part 20 records a program (chapter) provided from the channel selector 18.

The chapter selecting part 17 selects a chapter (scene) to be most highly recommended to a user, based on a score for each chapter of the program being broadcasted in each channel supplied from each channel block 15. The chapter selecting part 17 provides time information of the selected chapter, instructs the channel block 15, which receives the channel that broadcasts the selected chapter, to output the selected chapter, and instructs the channel selector 18 to select the channel.

The channel selector 18 selects the channel (that is, selects the chapter provided from the channel block 15) according to the instruction from the chapter selecting part 17, and outputs the selected channel (that is, the selected chapter) to the operation information acquiring part 16, a reproducing part 19 and the recording part 20.

The reproducing part 19 reproduces the chapter provided from the channel selector 18 and displays the reproduced chapter on a display (not shown).

The recording part 20 records the chapter provided from the channel selector 18 according to the operation contents from the operation information acquiring part 16 (that is, when the recording part 20 is instructed to record the chapter).

FIG. 2 shows an example of configuration of the channel block 15 of FIG. 1.

A receiving part 31 receives a channel of an analog terrestrial wave, for example, and provides data of a program of the received channel to a buffer 32, a chapter extracting part 33, a viewer responsiveness detecting part 34, and a meta information acquiring part 35.

The buffer 32 temporarily stores the data of the program provided from the receiving part 31. Specifically, the buffer 32 stores new data while deleting old data in order depending on its storage capacity. In addition, the buffer 32 is inputted with an output instruction (including time information) from the chapter selecting part 17. Receiving the output instruction, the buffer 32 reads out a chapter specified by the time information and provides the read chapter to the channel selector 18.

The chapter extracting part 33 extracts out a scene into which the program provided from the receiver 31 is arranged with some significance (for example, a CM section, a music part of a music program, a topical paragraph of a news program, etc.) based on video or audio features of the program, as a chapter, and informs a score calculating part 36 of broadcasting starting time and broadcasting ending time (time information) of the chapter.

The viewer responsiveness detecting part 34 detects viewer responsiveness of the program provided from the receiving part 31 from the video or audio features of the program, and provides the detected viewer responsiveness and broadcasting time of the video or audio features to the score calculating part 36. For example, a high level of viewer responsiveness may be obtained from a home-rum scene of a baseball broadcasting program or a football broadcasting program.

The meta information acquiring part 35 acquires character information obtained by recognition of title characters or recognition of audio from a closed caption of the program provided from the receiving part 31, as meta information of the program, and provides the acquired meta information to the score calculating part 36.

Whenever the chapter extracting part 33 informs the score calculating part 36 of the chapter, the score calculating part 36 calculates a score of the chapter, based on a result of comparison of the meta information corresponding to the chapter provided from the meta information acquiring part 35 and the EPG information corresponding the chapter provided from the EPG acquiring part 11 with the up-to-date news information provided from the RSS acquiring part 14, the symbol information provided from the symbol information managing part 12, and the viewing history provided from the viewing history managing part 13, and the viewer responsiveness obtained from the viewer responsiveness detecting part 34.

The score calculating part 36 provides the score of the chapter and the time information of the chapter to the chapter selecting part 17.

Next, an operation of the chapter selecting part 17 will be described with reference to a flow chart of FIG. 3.

In Step S11, the chapter selecting part 17 determines whether or not a chapter is currently reproduced. If it is determined that the chapter is not currently reproduced, the operation of the chapter selecting part 17 proceeds to Step S12.

In Step S12, the chapter selecting part 17 acquires scores of chapters being currently broadcasted. In addition, the chapter selecting part 17 is provided with time information and scores of chapters of a program being broadcasted in each channel from each channel block 15, and temporarily stores the time information and scores of the chapters.

Next, in Step S13, the chapter selecting part 17 detects the highest one of the scores acquired in Step S12, and selects a chapter having the highest score as a chapter to be reproduced (a chapter to be most highly recommended).

In Step S14, the chapter selecting part 17 provides the time information (starting time and ending time) of the selected chapter to the channel block 15 that accumulates the chapter, instructs the channel block 15 to output the selected chapter, and instructs the channel selector 18 to select one of inputs from the channel block 15 instructed to output the selected chapter (that is, to select the channel). Then, the selected chapter is provided to the reproducing part 19 in which the selected chapter is reproduced.

If it is determined in Step 11 that the chapter is currently reproduced, or if the chapter is instructed to be reproduced in Step S14, the operation proceeds to Step S15 where scores of chapters broadcasted at the ending time of the chapter being currently reproduced are acquired.

Next, in Step S16, the chapter selecting part 17 detects the highest one of the scores acquired in Step S15, and selects a chapter having the highest score as a chapter to be reproduced next.

In Step S17, the chapter selecting part 17 provides the time information of the selected chapter to the channel block 15, instructs the channel block 15 to output the selected chapter, and instructs the channel selector 18 to select one of inputs from the channel block 15 instructed to output the selected chapter. Then, the selected chapter is reproduced.

Next, in Step S18, the chapter selecting part 17 determines whether or not an instruction to change a chapter being currently reproduced is inputted from the operation information acquiring part 16. If it is determined that the instruction is inputted, the operation returns to Step S12 and the subsequent steps are performed. In other words, since a chapter newly selected before the chapter being currently reproduced is ended is reproduced, a user can have the new chapter displayed without waiting until the chapter being currently reproduced is ended.

If it is determined in Step S18 that the instruction to change the chapter being currently reproduced is not inputted, the operation proceeds to Step S19.

In Step S19, the chapter selecting part 17 determines whether or not an instruction to end the automatic zapping function is inputted from the operation information acquiring part 16. If it is determined that the instruction is not inputted, the operation returns to Step S11 and the subsequent Steps are performed.

If it is determined in Step S19 that the instruction to end the automatic zapping function is inputted, the chapter selecting part 17 ends the chapter selection process.

Through the above-described operation, a program of each received channel is changed in the unit of chapter according to user's taste, for example, and is automatically displayed. As a result, the user can efficiently find a desired program.

Although it is shown in the above description that the scores of chapters are determined using the EPG information, the symbol information, the viewing history, the RSS information, the mete information of the chapters, and the viewer responsiveness, other information may be used, or scores with appropriate weights may be calculated.

Figure 4:
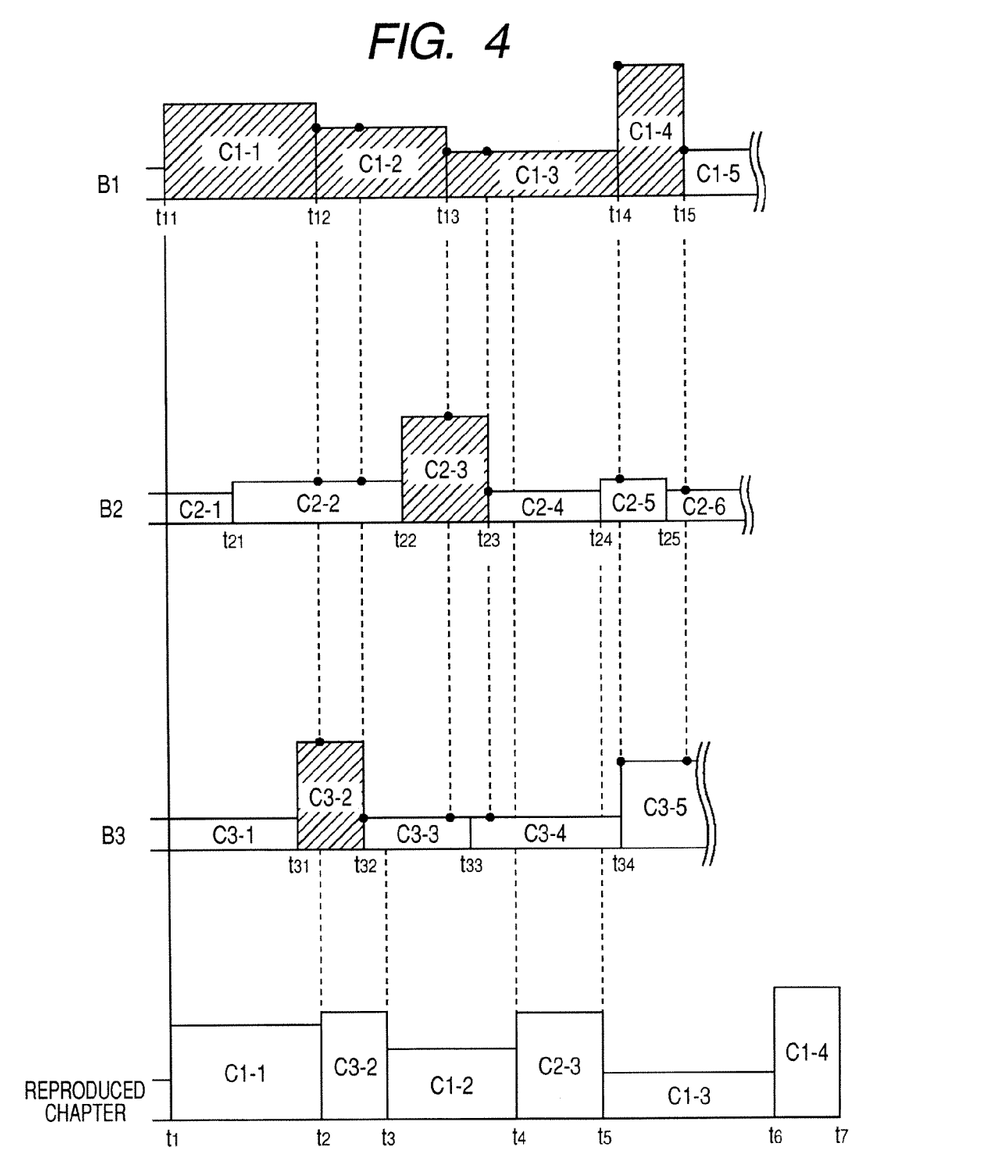
FIG. 4 is a view for explaining an example of the automatic zapping process.

Next, the above-described chapter selection process will be described with reference to FIG. 4 showing an example in which a program is being received.

In this example, a program B1, a program B2 and a program B3, which are being broadcasted according to a prescribed schedule, are received in the channel block 15-1, the channel block 15-2 and the channel block 15-3, respectively.

Scores of chapters C1-1, . . . , C1-5, . . . (hereinafter, simply referred to as chapter C1 if not needed to distinguish among them. This is also true of other cases.) of the program B1 are provided from the channel block 15-1 to the chapter selecting part 17. Scores of chapters C2-1, . . . , C2-6, . . . of the program B2 are provided from the channel block 15-2 to the chapter selecting part 17. Scores of chapters C3-1, . . . , C3-5, . . . of the program B3 are provided from the channel block 15-3 (not shown) to the chapter selecting part 17.

In addition, it is assumed that the chapter C1-1 of the program B1 is being reproduced at present time t1 (Step S11 in FIG. 3).

In addition, heights of the chapters of the programs B1 to B3 shown in FIG. 4 indicate the size of scores of the chapter. In addition, shaded chapters indicate chapters being reproduced, which will be described later (this is true of FIGS. 5 to 7, which will be described later).

The chapter selecting part 17 acquires scores of the chapter C1-2 of the program B1, the chapter C2-2 of the program B2 and the chapter C3-2 of the program B3, all of which are being broadcasted at broadcasting ending time t2 of the chapter C1-1 of the program B1 (Step S15), and selects the chapter C3-2 of the program B3 having the highest score as a chapter to be reproduced next (Step S16).

The chapter selecting part 17 provides broadcasting starting time t31 and ending time t32 of the selected chapter C3-2 to the channel block 15-3 in which the selected chapter C3-2 is accumulated, instructs the channel block 15-3 to output the chapter C3-2, and instructs the channel selector 18 to select input from the channel block 15-3 (Step S17).

Then, the channel block 15-3 reads the chapter C3-2 from the buffer 32 and provides the read chapter C3-2 to the channel selector 18. The channel selector 18 selects the chapter C3-2 provided from the channel block 15-3 and provides the selected chapter C3-2 to the reproducing part 19. Then, the chapter C3-2 is reproduced at the broadcasting ending time t2 of the chapter C1-1 and is ended at time t3.

Figure 7:
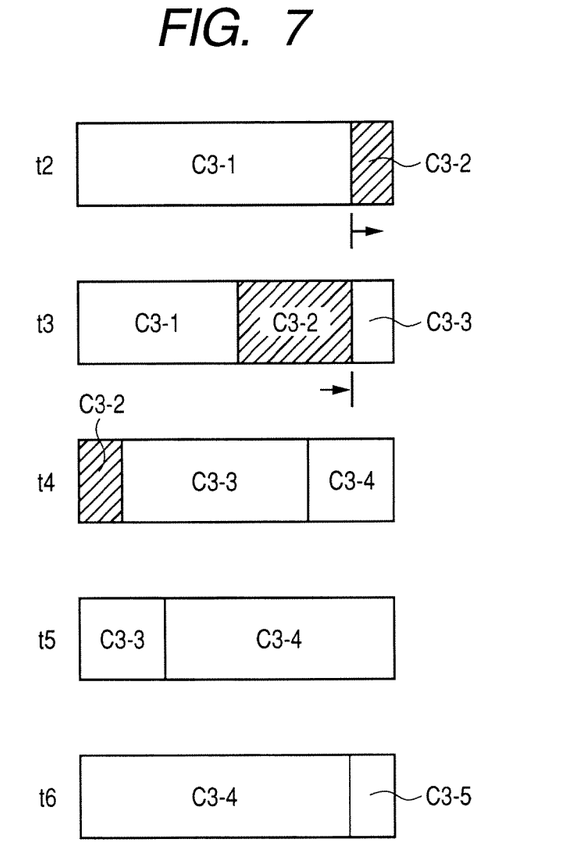
FIG. 7 is a view showing a memory state of a buffer of still another channel block in the example of FIG. 4.

In addition, since the time t2 is later than the broadcasting starting time t31 of the chapter C3-2, the head of the chapter C3-2 is stored in the buffer 32 of the channel block 15-3 at the time t2, for example, as shown in FIG. 7. Also, since the chapter C3-2 can be outputted according to an instruction from the chapter selecting part 17, the chapter C3-2 can be reproduced at the time t2.

FIG. 7 shows a memory state of the buffer 32 of the channel block 15-3 at the times t2 to t6 in the example of FIG. 4.

Next, the chapter selecting part 17 acquires scores of the chapter C1-2 of the program B1, the chapter C2-2 of the program B2 and the chapter C3-3 of the program B3, all of which are being broadcasted at broadcasting ending time t32 of the chapter C3-2, and selects the chapter C1-2 of the program B1 having the highest score as a chapter to be reproduced next.

The chapter selecting part 17 provides broadcasting starting time t12 and ending time t13 of the selected chapter C1-2 to the channel block 15-1 in which the selected chapter C1-2 is accumulated, instructs the channel block 15-1 to output the chapter C1-2, and instructs the channel selector 18 to select input from the channel block 15-1.

Then, the channel block 15-1 reads the chapter C1-2 from the buffer 32 and provides the read chapter C1-2 to the channel selector 18. The channel selector 18 selects the chapter C1-2 provided from the channel block 15-1 and provides the selected chapter C1-2 to the reproducing part 19. Then, the chapter C1-2 is reproduced at the reproducing ending time t3 of the chapter C3-2 and is ended at time t4.

Figure 5:
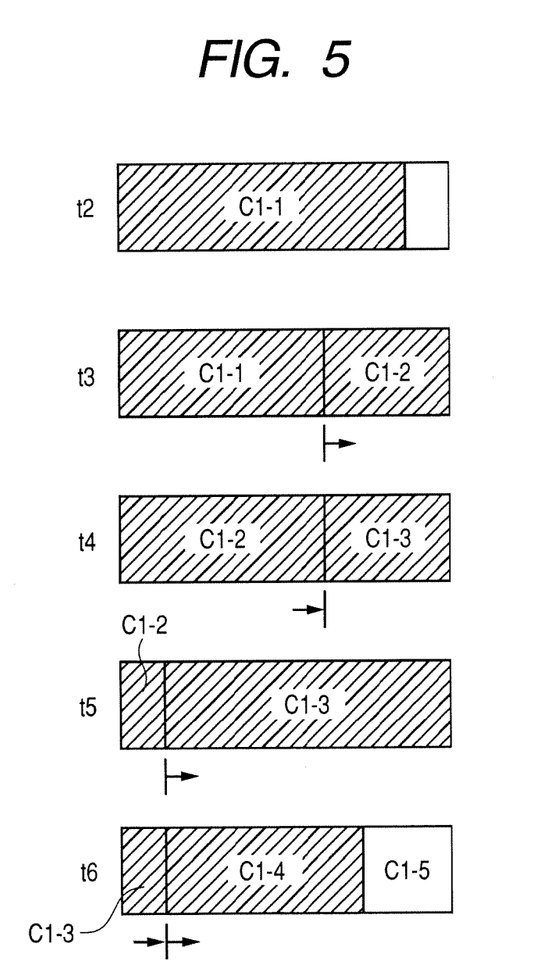
FIG. 5 is a view showing a memory state of a buffer of a channel block in the example of FIG. 4.

In addition, since the time t3 is later than the broadcasting starting time t12 of the chapter C1-2, the head of the chapter C1-2 is stored in the buffer 32 of the channel block 15-1 at the time t3, for example, as shown in FIG. 5. Also, since the chapter C1-2 can be outputted according to an instruction from the chapter selecting part 17, the chapter C1-2 can be reproduced at the time t3.

FIG. 5 shows a memory state of the buffer 32 of the channel block 15-1 at the times t2 to t6 in the example of FIG. 4.

Next, the chapter selecting part 17 acquires scores of the chapter C1-3 of the program B1, the chapter C2-3 of the program B2 and the chapter C3-3 of the program B3, all of which are being broadcasted at the broadcasting ending time t13 of the chapter C1-2, selects the chapter C2-3 of the program B2 having the highest score as a chapter to be reproduced next, provides broadcasting starting time t22 and ending time t23 of the selected chapter C2-3 to the channel block 15-2, instructs the channel block 15-2 to output the chapter C2-3, and instructs the channel selector 18 to select input from the channel block 15-2.

Then, the channel block 15-2 reads the chapter C2-3 from the buffer 32 and provides the read chapter C2-3 to the channel selector 18. The channel selector 18 selects the chapter C2-3 provided from the channel block 15-2 and provides the selected chapter C2-3 to the reproducing part 19. Then, the chapter C2-3 is reproduced at the reproducing ending time t4 of the chapter C1-2 and is ended at time t5.

Figure 6:
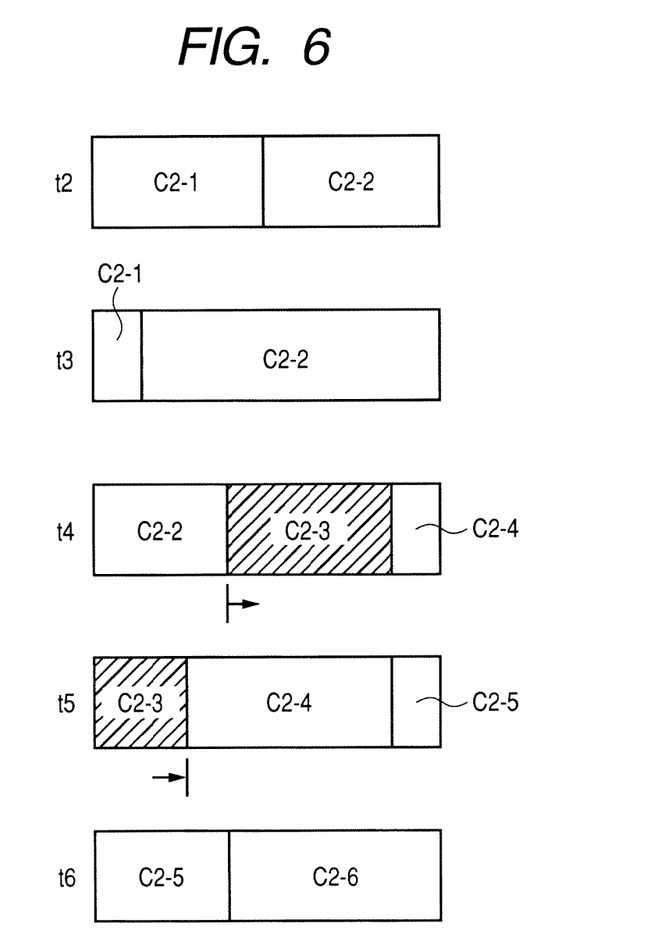
FIG. 6 is a view showing a memory state of a buffer of another channel block in the example of FIG. 4.

In addition, since the time t4 is later than the broadcasting starting time t22 of the chapter C2-3, the head of the chapter C2-3 is stored in the buffer 32 of the channel block 15-2 at the time t4, for example, as shown in FIG. 6. Also, since the chapter C2-3 can be outputted according to an instruction from the chapter selecting part 17, the chapter C2-3 can be reproduced at the time t4.

FIG. 6 shows a memory state of the buffer 32 of the channel block 15-2 at the times t2 to t6 in the example of FIG. 4.

Next, the chapter selecting part 17 acquires scores of the chapter C1-3 of the program B1, the chapter C2-4 of the program B2 and the chapter C3-4 of the program B3, all of which are being broadcasted at the broadcasting ending time t23 of the chapter C2-3, selects the chapter C1-3 of the program B1 having the highest score as a chapter to be reproduced next, provides broadcasting starting time t13 and ending time t14 of the selected chapter C1-3 to the channel block 15-1, instructs the channel block 15-1 to output the chapter C1-3, and instructs the channel selector 18 to select input from the channel block 15-1.

Then, the channel block 15-1 reads the chapter C1-3 from the buffer 32 and provides the read chapter C1-3 to the channel selector 18. The channel selector 18 selects the chapter C1-3 provided from the channel block 15-1 and provides the selected chapter C1-3 to the reproducing part 19. Then, the chapter C1-3 is reproduced at the reproducing ending time t5 of the chapter C2-3 and is ended at time t6.

In addition, since the time t5 is later than the broadcasting starting time t13 of the chapter C1-3, the head of the chapter C1-3 is stored in the buffer 32 of the channel block 15-1 at the time t5, for example, as shown in FIG. 5. Also, since the chapter C1-3 can be outputted according to an instruction from the chapter selecting part 17, the chapter C1-3 can be reproduced at the time t5.

Next, the chapter selecting part 17 acquires scores of the chapter C1-4 of the program B1, the chapter C2-5 of the program B2 and the chapter C3-5 of the program B3, all of which are being broadcasted at the broadcasting ending time t14 of the chapter C1-3, selects the chapter C1-4 of the program B1 having the highest score as a chapter to be reproduced next, provides the broadcasting starting time t14 and ending time t15 of the selected chapter C1-4 to the channel block 15-1, instructs the channel block 15-1 to output the chapter C1-4, and instructs the channel selector 18 to select input from the channel block 15-1.

Then, the channel block 15-1 reads the chapter C1-4 from the buffer 32 and provides the read chapter C1-4 to the channel selector 18. The channel selector 18 selects the chapter C1-4 provided from the channel block 15-1 and provides the selected chapter C1-4 to the reproducing part 19. Then, the chapter C1-4 is reproduced at the reproducing ending time t6 of the chapter C1-3 and is ended at time t7.

In addition, since the time t6 is later than the broadcasting starting time t14 of the chapter C1-4, the chapter C1-4 is stored in the buffer 32 of the channel block 15-1 at the time t6, for example, as shown in FIG. 5. Also, since the chapter C1-4 can be outputted according to an instruction from the chapter selecting part 17, the chapter C1-4 can be reproduced at the time t6.

As shown in FIG. 4, the chapters C1-1, C3-2, C1-2, C2-3, C1-3 and C1-4 (shaded in the figure) are selected as chapters to user's taste, for example, and changed and displayed in order, as shown in the lowest side of FIG. 4.

Although the broadcasting programs have been described as above by way of an example, the spirit of the present invention may be applied to other contents as long as they can be outputted according to a prescribed schedule.

A series of processes as described above may be performed by either hardware or software. If the series of processes are performed by software, a program configuring the software is installed as a program recording medium in a computer that is built in a dedicated hardware, a general-purpose personal computer in which various programs to perform various functions are installed, etc.

Figure 8:
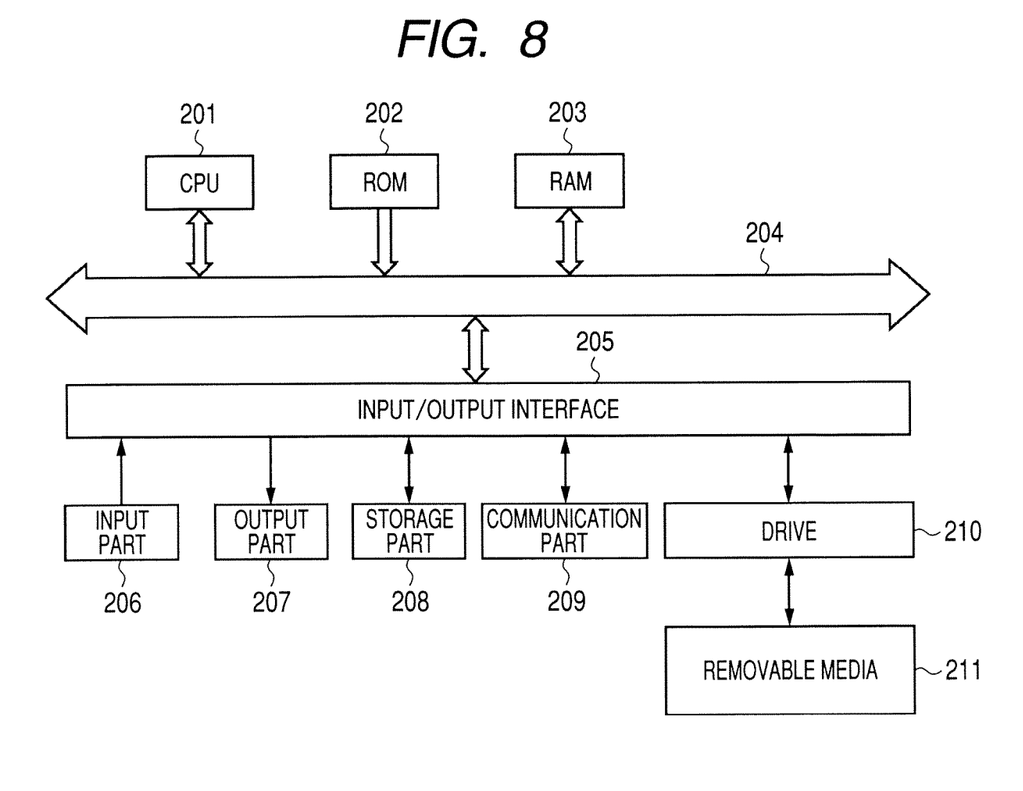
FIG. 8 is a block diagram showing an example of configuration of a personal computer.

FIG. 8 is a block diagram showing an example of configuration of a personal computer that executes the series of processes as described above. A CPU (Central Processing Unit) 201 performs various processes according to programs stored in a ROM (Read Only Memory) 202 or a storage unit 208. A RAM (Random Access Memory) 203 is used to store programs executed by the CPU 201 and various data. The CPU 201, the ROM 202 and the RAM 203 are interconnected by a bus 204.

As the CPU 201, a cell disclosed in a book titled "Cell Birth," published by Nikkei BP. Inc., Page 89 to 117, Feb. 28, 2005, may be employed.

In addition, an input/output interface 205 is connected to the CPU 201 via the bus 204. An input unit 206 including a keyboard, a mouse, a microphone, etc., a display, and an output unit including a speaker and so on are connected to the input/output interface 205. The CPU 201 performs various processes according to instructions from the input unit 206. In addition, the CPU 201 outputs a result of performance to the output unit 207.

The storage unit 208 connected to the input/output interface 205 includes, for example, a hard disk and stores programs executed by the CPU 201 and various data. A communication unit 209 communicates with an external apparatus via a network such as Internet, a local area network or the like.

Programs may be acquired through the communication unit 209 and may be stored in the storage unit 208.

When removable media 211 such as a magnetic disk, an optical disk, a semiconductor memory and the like are loaded in a drive 210 connected to the input/output interface 205, the drive 210 drives the removable media 211 to acquire programs and data stored in the removable media 211. The acquired programs and data are transmitted to and stored in the storage unit 208, if necessary.

The program recording medium that is installed in the personal computer and stores programs to be executed by the personal computer may be configured by the removable media 211 as a package media such as a magnetic disk (including a flexible disk), an optical disk (including a CD-ROM (Compact Disc-Read OnlyMemory), a DVD (Digital Versatile Disc), a magneto-optical disk, a semiconductor memory or the like, the ROM 202 in which programs are temporarily or permanently stored, a hard disk forming the storage unit 208, etc., as shown in FIG. 8. Storage of the programs into the program recording medium is conducted using wired or wireless communication media, such as a local area network, Internet, a digital satellite broadcasting or the like, through the communication unit 209 as an interface such as a router, a modem or the like, if necessary.

In addition, in the specification, the steps describing the programs stored in the program recording medium may include processes performed in parallel or individually as well as processes performed in a time-series manner according to a described sequence.

It should be understood by those skilled in the art that various modifications, combinations, sub-combinations and alterations may be occur depending on design requirements and other factors insofar as they are within the scope of the appended claims or the equivalents thereof.

What is claimed is:

1. An information processing apparatus that selects particular contents from a plurality of contents outputted according to a prescribed schedule and outputs the selected contents, comprising:
   a memory; and
   circuitry configured to
      receive the plurality of contents from a plurality of channels,
      disassemble each of the plurality of contents from the plurality of channels into chapters,
      store the chapters in the memory,
      stop output of a currently selected chapter at a first time point, a stopping point of the currently selected chapter corresponding to a second time point according to the prescribed schedule, and the first time point being later than the second time point,
      identify, according to the prescribed schedule, one or more chapters that are scheduled to be broadcasted at the second time point,
      determine degrees of recommendation of the identified chapters based on information obtained from the identified chapters and information indicative of a user preference,
      select one of the identified chapters based on the determined degrees of recommendation, and
      start, after the first time point, output of the selected one of the identified chapters from the beginning thereof, the selected one of the identified chapters having a scheduled starting time earlier than the first time point.

2. The information processing apparatus according to claim 1, wherein the information indicative of the user preference includes EPG information, RSS information, symbol information, or viewing history information, and
   wherein the information obtained from the identified chapters includes meta information.

3. The information processing apparatus according to claim 2, wherein the symbol information includes symbol information corresponding to different users.

4. The information processing apparatus according to claim 1, further comprising a buffer, wherein new chapters are stored in the buffer while old chapters are sequentially removed from the buffer, depending on a storage capacity of the buffer.

5. The information processing apparatus according to claim 1, wherein the circuitry disassembles a scene, into which the contents are arranged with significance based on video or audio features of the contents, as a chapter.

6. The information processing apparatus according to claim 1, wherein each of the plurality of contents is received on a different channel, and the circuitry selects the selected one of the chapters by changing to a corresponding channel.

7. The information processing apparatus according to claim 1, wherein the circuitry selects a chapter with a highest determined degree of recommendation as the selected one of the identified chapters.

8. An information processing method for causing an information processing apparatus to select particular contents from a plurality of contents outputted according to a prescribed schedule and outputting the selected contents, the method comprising:
   receiving the plurality of contents from a plurality of channels by the information processing apparatus;
   disassembling, by the information processing apparatus, the plurality of contents from the plurality of channels into chapters;
   stopping output of a currently selected chapter at a first time point, a stopping point of the currently selected chapter corresponding to a second time point according to the prescribed schedule, and the first time point being later than the second time point;
   identifying, according to the prescribed schedule, one or more chapters that are scheduled to be broadcasted at the second time point;
   determining degrees of recommendation of the identified chapters based on information obtained from the identified chapters and information indicative of a user preference;
   selecting one of the identified chapters based on the determined degrees of recommendation; and
   starting, after the first time point, output of the selected one of the identified chapters from the beginning thereof, the selected one of the identified chapters having a scheduled starting time earlier than the first time point.

9. The method according to claim 8, wherein each of the plurality of contents is received on a different channel, and the selected one of the chapters is selected by changing to a corresponding channel.

10. The method according to claim 8, wherein the selecting of the one of the identified chapters includes selecting a chapter with a highest determined degree of recommendation as the selected one of the identified chapters.

11. A non-transitory computer-readable medium storing computer-readable instructions thereon, the computer-readable instructions when executed by a computer cause the computer to perform a method comprising:
   receiving a plurality of contents from a plurality of channels;
   disassembling the plurality of contents from the plurality of channels into chapters;
   stopping output of a currently selected chapter at a first time point, a stopping point of the currently selected chapter corresponding to a second time point according to a prescribed schedule, and the first time point being later than the second time point;
   identifying, according to the prescribed schedule, one or more chapters that are scheduled to be broadcasted at the second time point;
   determining degrees of recommendation of the identified chapters based on information obtained from the identified chapters and information indicative of a user preference;
   selecting one of the identified chapters based on the determined degrees of recommendation; and
   starting, after the first time point, output of the selected one of the identified chapters from the beginning thereof, the selected one of the identified chapters having a scheduled starting time earlier than the first time point.

12. The non-transitory computer-readable medium according to claim 11, the selected chapter is selected by changing to one of the plurality of channels on which content corresponding to the selected chapter is received.

\* \* \* \* \*